(12) United States Patent
Fleisch et al.

(10) Patent No.: US 7,918,604 B2
(45) Date of Patent: Apr. 5, 2011

(54) LINEAR GUIDE

(75) Inventors: Christian Fleisch, Hasle-Rüegsau (CH); Rudolf Güdel, Solothurn (CH); Walter Zulauf, Ursenbach (CH)

(73) Assignee: Gugel Group AG, Langenthal (CH)

( * ) Notice: Subject to any disclaimer, the term of this patent is extended or adjusted under 35 U.S.C. 154(b) by 457 days.

(21) Appl. No.: 11/988,515

(22) PCT Filed: Jul. 20, 2006

(86) PCT No.: PCT/CH2006/000380
§ 371 (c)(1),
(2), (4) Date: May 30, 2008

(87) PCT Pub. No.: WO2007/012211
PCT Pub. Date: Feb. 1, 2007

(65) Prior Publication Data
US 2009/0263056 A1    Oct. 22, 2009

(30) Foreign Application Priority Data

Jul. 27, 2005   (EP) .................................... 05405455

(51) Int. Cl.
*F16C 31/04*    (2006.01)

(52) U.S. Cl. .......................................... 384/58; 384/57

(58) Field of Classification Search .................... 384/58, 384/50, 53, 55, 57, 59, 449, 504, 506; 105/29.1, 105/30
See application file for complete search history.

(56) References Cited

U.S. PATENT DOCUMENTS

| | | |
|---|---|---|
| 3,661,431 A | 5/1972 | Wisecarver |
| 5,086,705 A | 2/1992 | Jarvis et al. |
| 5,735,214 A | 4/1998 | Tsuboi |
| 2006/0140519 A1* | 6/2006 | Fournier .......................... 384/58 |

FOREIGN PATENT DOCUMENTS

| | | |
|---|---|---|
| DE | 38 29 276 C2 | 3/1990 |
| DE | 90 16 625.6 | 2/1991 |
| DE | 43 10 087 A1 | 9/1994 |
| DE | 195 17 926 A1 | 11/1996 |
| DE | 196 27 765 A1 | 1/1998 |
| EP | 0 916 860 B1 | 5/1999 |
| GB | 708605 | 5/1954 |

\* cited by examiner

*Primary Examiner* — Thomas R Hannon
(74) *Attorney, Agent, or Firm* — Birch, Stewart, Kolasch & Birch, LLP (57) ABSTRACT

A linear guide comprises a rail with profiled elements on two opposite sides, and a roll unit. The roll unit and the rails can be displaced in relation to each other in the longitudinal direction of the rails. The roll unit comprises at least two rolls which can run on the profiled elements of the opposite sides of the rail. The rolls are mounted on the roll unit by means of prestressed angular ball bearings and can be prestressed in relation to the rails by a pre-determined force.

21 Claims, 3 Drawing Sheets

LINEAR GUIDE

TECHNICAL FIELD

The invention relates to a linear guide for a rail with profilings on two opposite sides and with a roll unit, the roll unit and the rail being displaceable relative to one another in the rail longitudinal direction, and the roll unit having at least two rolls which can run on the profilings of the opposite sides of the rail. The invention relates, further, to a roll unit for a linear guide of this type.

PRIOR ART

Linear guides of the abovementioned type are known. EP 0 916 860 B1 (INA Wälzlager Schaeffler) shows, for example, a linear bearing arrangement with a guide rail, with a carrying body and with at least one pair of running rolls which are designed as bearing outer rings of rolling bearings. The guide rail consists, for example, of an aluminum alloy and has grooves for the reception of running rails made from steel. Each bearing inner ring has fastened to it adjacently to one end face a centering ring which centers the bearing inner ring and which is inserted into a fitting bore of the carrying body.

U.S. Pat. No. 3,661,431 (Bishop-Wisecarver Corporation) shows guide rolls with a v-shaped guide channel, the inner and outer flanks of the channel in each case having a 90° angle with respect to one another. It is thereby possible to cause these guide rolls to roll on both sides of a v-shaped rail. The rolls are mounted-on ball bearings by means of an eccentric bush which makes it possible to adapt the play between the roll and the rail. Thus, rails of various types can be used with the same running carriage, or the roll spacing can be adapted to manufacturing tolerances of the rail used.

Linear guides of this type are suitable for moving small loads and can absorb only low forces. Higher forces or torques which have a component parallel to the rail longitudinal axis lead, because of the play in the rolling bearing and between the running rolls and the running rails, to a variation in the relative position of the carrying bodies and of the guide rails. As a result, on the one hand, the longitudinal movement of the carrying body with respect to the rail is impeded and, on the other hand, positional errors of the parts to be moved (for example, a tool) occur.

DE G 90 16 625.6 (Nadella) relates to a slide with at least four guide rolls which is capable of being moved along a longitudinal guide. This is formed from wire-like round bars and may also comprise curved segments. The guide rolls are arranged in the corners of a quadrangular carriage plate. Each guide roll has two running rings which are parallel to one another and are mounted rotatably on a shaft by means of bearing bodies. The lower running ring cooperates with an inner ring which is held longitudinally displaceably on the shaft. Between the inner ring and the screw head, a cup spring is arranged. This makes it possible to compensate stresses, for example in the transitional range between travel straight ahead and travel on a bend, in that, by the gap spring being compressed, the gap between the running rings can be widened and therefore the effective spacing of the rolls can be increased.

This guide, too, is designed for small loads. To be precise, so that even travels on a bend become possible, the effective spacing of the guide rolls must be variable within certain limits. The result of this, however, is that, when higher forces take effect, play occurs between the guide rolls and the longitudinal guide, and therefore the linear movement is impeded and the exact positioning of the carriage is lost.

DE 38 29 276 C2 (SKF Linearsysteme) relates to a carrying body with a plurality of running rollers, between which a guide rail with a slide is movable. The guide rail is fastened in its axis of symmetry by means of a screw to the slide movable back and forth. The running rolls stand opposite one another with parallel axes of rotation transversely to the guide rail and roll with a circumferential groove on opposite roof-shaped running tracks of the guide rail. The running rolls are designed as outer rings of two-row angular ball bearings. Their inner rings run on bolts, spring-elastic elements being arranged radially between the bolts and the bearing inner rings. These elements generate some prestress of the running roll with respect to the associated running track. The design makes it possible to use, for fastening the running rolls, bolts and spring elements which can be produced in a simple way.

The prestress of the running roll with respect to the running track results in an improved behavior of the linear guide even under increased loads or forces, in that these forces, up to a specific maximum, can be absorbed by the spring-elastic elements between the bolts and the bearing inner rings.

However, the possible prestress is restricted as a consequence of design and cannot readily be set to a predetermined value. Moreover, the maximum force absorption and the positioning accuracy are limited by play which is present in the ball bearing.

PRESENTATION OF THE INVENTION

The object of the invention is to provide a linear guide which belongs to the technical field initially mentioned and which is also suitable for moving larger loads and can absorb higher forces, without the running properties or the positioning accuracy of the guide being adversely influenced.

The solution for achieving the object is defined by the features of claim 1. According to the invention, the rolls are mounted on the roll unit by means of prestressed angular ball bearings, and the rolls can be prestressed with a predetermined force with respect to the rail.

Owing to the defined prestress both in the angular ball bearing and of the rolls with respect to the rail, the mounting is play-free even under an increased load, so that frictionless operation and accurate positioning are ensured. The prestresses cooperate in such a way that, in the overall mounting of the roll unit with respect to the rail, a high rigidity is achieved, so that even higher forces can be absorbed.

The linear guide is therefore also suitable for moving tools for medium-heavy machine operations, such as, for example, laser cutting, water-jet cutting or the machining of wood. The linear guide according to the invention can therefore be used instead of structurally more complicated and therefore more costly ball-type and roll-type recirculating guides. Moreover, as compared with these, it allows higher dynamics because high forces do not arise during deflection, as they do in recirculating guides. Finally, because of its simpler construction and the smaller number of moved parts, the linear guide according to the invention has a longer lifetime and is less sensitive to contamination.

In the linear guide according to the invention, the roll unit is preferably designed as a running carriage which is movable with respect to the fixedly arranged rail. A use is also possible, however, in which the rail, together with elements arranged on it, is displaced with respect to a fixedly arranged roll unit.

Advantageously, the prestress of the angular ball bearings and the prestress of the rolls with respect to the rail are coordinated with one another as a function of a nominal load in such a way that a maximum deflection in the angular ball bearings and a maximum deflection of the rolls (or of their axes of rotation) with respect to the rail under nominal load are approximately identical. A maximum rigidity of the mounting, along with the lowest possible running resistance, is thereby achieved, since the possible force absorption is determined by the "weaker link"; an excessively high prestress of one of the elements therefore leads only to a correspondingly higher running resistance (and a correspondingly higher load on the components involved), without the rigidity being appreciably increased. The (acceptable) deflections remaining when permissible forces take effect are thus to be distributed uniformly to the ball bearings or to the mounting of the rolls with respect to the rail. The coordination of the prestresses may take place as a function of the amount and direction of the expected maximum forces. In the case of different directions of the maximum force, for example different arrangements of the roll unit on the rail, or in the case of different loads, other prestresses may be selected even when the amount of the force for the ball bearings and for the rolls is the same.

Preferably, the angular ball bearings are two-rowed and have split inner rings. This allows high prestresses and high pressure angles and therefore an absorption of radial and axial forces, the latter in both directions. The prestressing of the angular ball bearing can be predetermined in a defined manner by the coordination of the inner rings and the choice of the ball diameter.

Preferably, the running rings of the rolls are mounted by means of the angular ball bearings on bolts supported on both sides. By the bolts being mounted on both sides, the rigidity of the arrangement is decisively increased, so that even higher prestresses between the rolls and the rail can be applied in a defined manner. The linear guide can therefore absorb higher maximum forces. At the same time, the bolt may be designed with a relatively small cross section, so that the roll mounting can be manufactured more compactly.

If the maximum forces to be absorbed are restricted or occur only in specific directions, the two-sided support may be dispensed with. In this instance, the bolt is advantageously designed to be somewhat more robust.

Advantageously, at least one of the rolls is mounted on an adjustable eccentric. This allows an accurate setting of the predetermined prestress of the roll with respect to the rail, for which purpose only relatively low forces also have to be expended at the same time. The prestress, once set, can be fixed by an antitwist device being provided for the eccentric. As a rule, for a reliable setting of the prestress, it is sufficient if all the rolls are mounted on an adjustable eccentric on one of the opposite sides of the rail, while all the rolls on the other rail side can be mounted on a fixed shaft. The prestress introduced by setting the eccentricity of the eccentrically mounted rolls is in any case distributed to the rolls on both sides of the rail, the quantitative distribution being dependent on the arrangement of the rolls with respect to the rail and on the type of load to be moved.

Alternatively, other means for setting the prestress of the rolls with respect to the rail are provided. The bearing bolt of the angular ball bearing may, for example, be moved along a linear guide toward the rail and away from the latter.

Advantageously, the eccentric comprises the following:
a) An eccentric bolt, on which the roll is mounted via the angular ball bearing;
b) a bearing disk which can be pushed onto the eccentric bolt;
c) a tension nut having an internal thread, by means of which the tension nut can be screwed onto a corresponding external thread of the eccentric bolt, so that the bearing disk is firmly clamped between the tension nut and the angular ball bearing and the angular ball bearing is prestressed; and
d) a tension plate which can be tightened in the axial direction in such a way that it cooperates frictionally with an outside of the bearing disk and fixes the latter and the eccentric bolt.

That portion of the eccentric bolt which carries the inner ring of the angular ball bearing is designed eccentrically. The prestress is set by rotating the bolt, so that the distance of the bearing axis from the contact surface of the roll with the rail is varied. By the tension nut being tightened, the bearing disk is pressed in the axial direction against the inner ring of the angular ball bearing. As a result, the pressure exerted on the balls by the inner ring is increased, and therefore a prestress is built up in the angular ball bearing. Quantitatively, the prestress is determined ultimately by the size of the ball used in the ball bearing and by the geometry of the inner and the outer ring of the angular ball bearing. After the tightening of the tension nut, the latter, the bearing disk, the bearing bolt and the actual angular ball bearing form an insert which can be inserted into the corresponding bearing of the roll unit. A radial securing screw known per se may be provided for the tension nut in order to prevent the latter from twisting with respect to the bearing bolt.

After the roll unit has been placed onto the rail, the eccentric bolt can be brought into a rotary position in which the desired prestress between the roll and the rail is achieved. In this case, the tension nut screwed onto the bolt and the firmly clamped bearing disk are also co-rotated. Subsequently, the tension plate is tightened in the axial direction until it cooperates frictionally with a side, facing it, of the bearing disk and thus fixes the tension nut and the eccentric bolt against twisting. The set prestress is thus maintained. Since the tension plate is moved axially, that is to say in a direction parallel to the bearing bolt, towards the bearing disk and does not execute any rotation during tightening, the set eccentricity and consequently the prestress are not influenced by the tightening, in contrast to known double nut arrangements. So that the tension plate can be tightened axially, for example, a plurality of screws may be provided, the shanks of which are led through holes in a marginal region of the tension plate and cooperate in each case with a thread in the roll unit.

Advantageously, the eccentric bolt has a profiled head (for example, with a hexagonal inner or outer profile) which is arranged in such a way that the prestress of the corresponding roll with respect to the rail can be set by means of a suitable torque wrench. Subsequently, the set prestress is fixed by means of the tightening of the tension plate, as described above. The tension plate preferably has a central cutout through which the profiled head of the eccentric bolt can pass.

Linear guides are known in which a plurality of (in particular, two) rails are arranged in parallel, a unit movable along the respective rail cooperating with each of the rails, and these units being rigidly connected mechanically and jointly carrying the load to be moved. Guides of this type, on account of the larger guide base, have a higher stability and can therefore absorb higher forces. However, the spacing of the rails along the guide track is not exactly constant, because slight differences in the rail spacing occur, for example, due to the different thermal expansion of different materials or because of mechanical influences. So that frictionless operation is possible even when deviations of this type are present, the different rail spacing has to be compensated. This advantageously takes place, within the scope of the present invention, in that the rolls at one of the roll units are mounted in such a way that they are movable in the direction of their axis of rotation with respect to the roll unit. By contrast, the further roll unit cooperating with the other rail has axially fixedly mounted rolls, so that its accurate positioning is not impaired by compensation.

In order to allow this axial movability, a bearing bolt, on which the roll is mounted via the angular ball bearing, is preferably fastened in a central orifice of a spring disk, the spring disk being fastened in its marginal region to the roll unit. The spring disk is elastic and therefore allows an axial movement of the bearing bolt, together with the parts mounted on it, while this movement can be guided by the bearing of the roll unit of the respective roll insert and, if appropriate, restricted. In order to allow and define the axial movement, the spring disk preferably has a plurality of slots. By the slot lengths and slot positions being selected, the required force for the axial movement of the bearing bolt can be predetermined. The slots are advantageously designed such that the spring disk is torsionally rigid, that is to say the bearing bolt cannot be twisted with respect to the roll unit. This is to be adhered to particularly in the case of the mounting of eccentric bolts.

Advantageously, the rolls are arranged on the roll unit in such a way that their axes of rotation are oriented parallel to one another and to the opposite sides of the rail and also perpendicularly to the rail longitudinal direction. This allows a compact design of the roll unit and makes it possible to support the bearing bolts of the angular ball bearings on both sides.

Alternatively to this, the axes of rotation of the rolls may have orientations different from one another or may stand obliquely to the opposite sides of the rail and, for example, cooperate with correspondingly inclined running tracks of the rail.

Preferably, the axes of rotation of the at least two rolls run in the same plane, the plane being oriented perpendicularly to the rail longitudinal direction. The rolls thus act on the rail at points lying opposite one another with respect to the rail body, and the rail is as it were clamped between the rolls on account of the prestress of the latter. The prestress can thus be set accurately. Moreover, because of this arrangement of the rolls, flexural forces on the rail or on the roll unit, such as occur when rolls are not opposite one another, are largely avoided. In a preferred embodiment of the invention, each roll unit has two pairs of rolls lying opposite one another, and therefore is movable independently along the rail and can have a compact construction.

Advantageously, the rail is manufactured from hardened and ground solid steel. This material affords high rigidity, as compared with other materials often used in roll guides (such as, for example, light metal, if appropriate with steel inserts) and can be processed very accurately with low manufacturing tolerances. Their thermal behavior is also advantageous, as compared with light metal rails. Finally, such rails are commercially available in one piece with a length of up to at least 6 m.

The profilings of the opposite sides of the rail are preferably designed as inner profilings. As a result, with a given size of the roll unit, rolls of a larger diameter than in the case of alternatively usable outer profilings can be employed; more space for the roll mounting is correspondingly available in the roll. Larger bearings with a higher load-bearing capacity can consequently be used.

Advantageously, the profilings have in each case two oblique flanks, and the rolls are designed in such a way that each of the rolls cooperates with both flanks. The profilings are therefore "v"-shaped or "u"-shaped in cross section, the axes of rotation of the rolls being perpendicular to the plane of symmetry of the profile cross section. In order to contact both flanks, comparatively large rolls are used which can absorb correspondingly high forces and which, even in the case of high speeds and accelerations, experience only moderate rates of revolution or angular accelerations. Thus, for a given load, the number of rolls and, correspondingly, the cost outlay and the weight of the device can be reduced. If the profiling is designed as an inner profiling, moreover, in the case of a two-row angular ball bearing the forces mainly occurring and transmitted from the two flanks to the rolls can be diverted optimally, in that the pressure angle of the angular ball bearing is adapted to the angle of inclination of the flanks and to the correspondingly expected forces.

The outer surfaces, cooperating with the flanks, of the rolls are preferably curved convexly. Thus, two rolling points of the roll surface with the lateral flanks of the inner profile are defined. Differential slip is avoided, and therefore fluctuations in the displacement resistance due to load changes and to positioning errors are reduced to a minimum.

Preferably, the pressure angles in the angular ball bearing are adapted to a pitch of the two flanks in such a way as to produce essentially identical part forces in the loaded angular ball bearings when the roll unit and the rail are arranged one above the other or next to one another in relation to one another. Thus, the roll unit/rail arrangement can be mounted in various ways, without different combinations having to be made available. If, for example, a roll unit with two pairs of rolls is considered, then, with a lateral mounting of the roll unit on the rail, predominantly radial forces act on two of the four angular ball bearings; by contrast, if the roll unit is suspended below the rail, then predominantly axial forces take effect, but these are distributed to all four angular ball bearings. The pressure angle, then, is selected approximately such that the forces transmitted in each case via a ball of the loaded bearings are approximately identical in both situations. In this case, account must be taken of the fact that radial forces are in each case distributed to a larger number of balls than axial forces. Investigations have shown that this aim is achieved when a pressure angle (measured in relation to a straight line running radially) of 20-40°, preferably 25-35°, is selected in the case of conventional angular ball bearings.

On account of the rigidity of its construction and the corresponding positional accuracy, the linear guide according to the invention can be provided with a measurement system for detecting a position of the roll unit with respect to the rail. The measuring operation may take place incrementally, but advantageously the measurement system is designed in such a way that the position of the roll unit can be determined absolutely. The linear guide can consequently also be used for highly accurate machining steps. The measurement system may comprise, for example, a scale integrated into the rail and also a measuring head which is arranged on the roll unit and which senses the scale and can thus determine its absolute position with respect to the rail. Systems of this type are known per se from ball-type and roll-type recirculating guides, although the use of such systems has not been possible or not expedient in conventional roll guides because of the lack of accuracy in the mounting of the running carriage on the rail.

For the abovementioned reasons, a brake system can also be used which is fastened to the roll unit and has a brake key which can cooperate with one side of the rail in order to brake the relative movement of the roll unit and of the rail. Brake systems of this type are known per se in ball-type and roll-type recirculating guides, but could not be used with conventional roll guides because a considerable play between the roll unit and the rail and the correspondingly necessary large spacing of the brake key and the rail in a nonactuated brake made rapid and accurate braking impossible. In contrast to this, in the linear guide according to the invention, the accurate guidance of the roll unit on the rail affords benefit in as much as the brake key does not brush against the rail even in the case of a low predetermined braking stroke.

Further advantageous embodiments and feature combinations of the invention may be gathered from the following detailed description and from the patent claims, taken as a whole.

BRIEF DESCRIPTION OF THE DRAWINGS

In the drawings used to explain the exemplary embodiment.

Identical parts are basically given the same reference symbols in all the figures.

WAYS OF IMPLEMENTING THE INVENTION

Figures 1A, 1B:
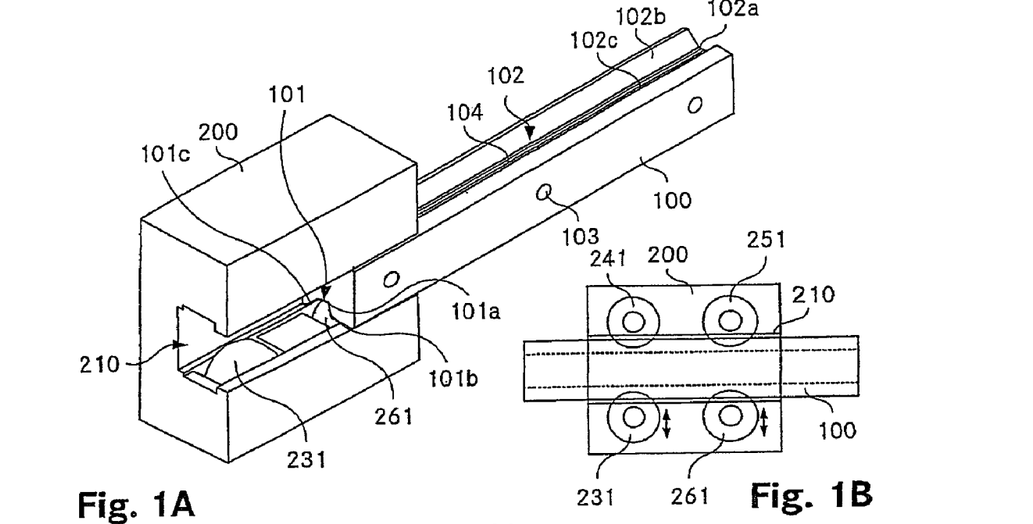
FIG. 1A shows an oblique view of a linear guide according to the invention.
FIG. 1B shows a diagrammatic illustration of a cross section through the linear guide, parallel to the rail longitudinal direction.

FIG. 1A shows an oblique view of a linear guide according to the invention, and FIG. 1B demonstrates diagrammatically a cross section through the linear guide, parallel to the rail longitudinal direction. The linear guide comprises a straight rail 100 and a roll unit 200 (running carriage) which is displaceable along the rail 100. The inside, facing the rail 100, of the roll unit 200 can be seen in FIG. 1A. This inside has a channel 210 for receiving a portion of the rail 100. Two rolls 231, 261; 241, 251 (see also FIG. 1B) are arranged in each case on both sides adjacently to the channel 210 and so as to project partially into the latter. Their axes of rotation are parallel to one another, and stand perpendicularly to the longitudinal extent of the rail 100 and also perpendicularly to the main surface of the roll unit 200. As can be seen in FIG. 1B, in each case two rolls 231, 241 and 251, 261 stand directly opposite one another with respect to the rail 100, so that the rail 100 is as it were clamped between the respective rolls 231, 241 and 251, 261.

Two of the rolls 231, 261 which are arranged on the same side of the rail 100 are mounted eccentrically, so that a prestress could be set between the rolls 231, 241, 251, 261 and the rail 100 when the roll unit 200 is placed onto the rail 100.

The rail 100 is manufactured from hardened solid steel and on two opposite sides has precision-ground inner profiles 101, 102 running along the rail longitudinal direction. These are u-shaped in cross section, two flanks 101b, 101c, 102b, 102c running obliquely outward symmetrically to one another from a horizontal base 101a, 102a, so that the channel cross section widens, starting from the base 101a, 102a. Each of the rolls 231, 241, 251, 261 cooperates in each case with both flanks 101b, 101c and 102b, 102c of the corresponding profile 101 or 102. The rolls are correspondingly dimensioned, and because of their correspondingly large diameter moderate angular accelerations only occur, so that the linear guide can be used up to speeds of 12-15 m/s on corresponding accelerations.

Figure 3A:
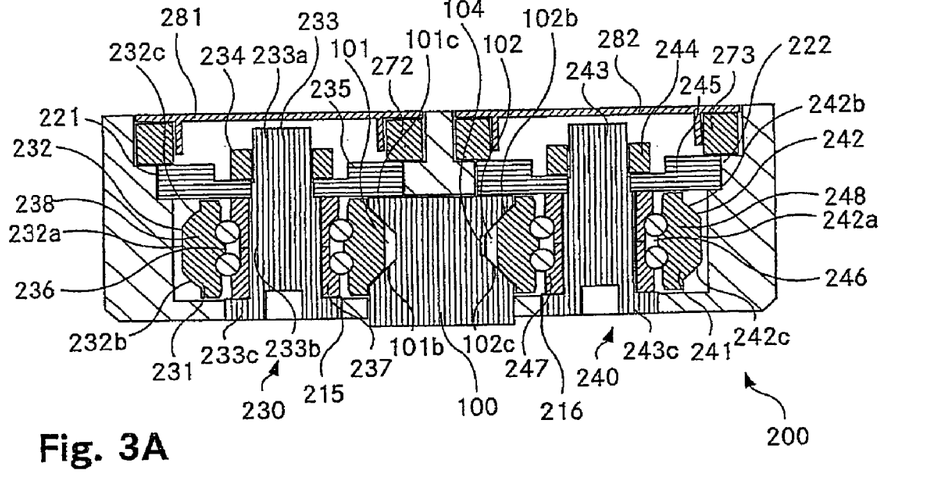
FIG. 3A shows a cross section through the roll unit of the linear guide.

A scale 104 for a corresponding measurement system is arranged in the base 102a of one of the inner profiles 102 (cf. also FIG. 3A). This scale has in a way known per se a plurality of markings which identify absolute positions on the rail. The markings may be formed differently and, for example, be detectable optically or magnetoresistively. For the measurement process, the roll unit 200 has arranged fixedly on it a measuring head comprising a sensor, by means of which the position information of the scale can be detected (not illustrated). The detected information is processed electronically into (absolute) position values and transmitted, for example, to a machine control.

The rail 100 has along its longitudinal direction a plurality of bores 103 which run along the axis of symmetry of the rail, that is to say parallel to the roll axes of the roll unit 200 placed onto the rail 100. By means of the bores 103, the rail can be screwed in a space-saving way along its axis of symmetry to a carrier, a machine stand or a wall, a stable mounting of the rail being obtained. On the (invisible) opposite side of the rail, the bores 103 have, adjacently to their orifices, recesses for receiving the screw heads.

As illustrated in FIG. 1, the roll unit 200 can be mounted laterally on the rail 100, that is to say the roll axes are horizontal during operation. Depending on the intended use, however, the arrangement may also be rotated, as desired, about the rail longitudinal axis, in particular the roll unit 200 may be arranged, suspended below the rail 100, so that the roll axes are oriented vertically during operation.

Figure 2:
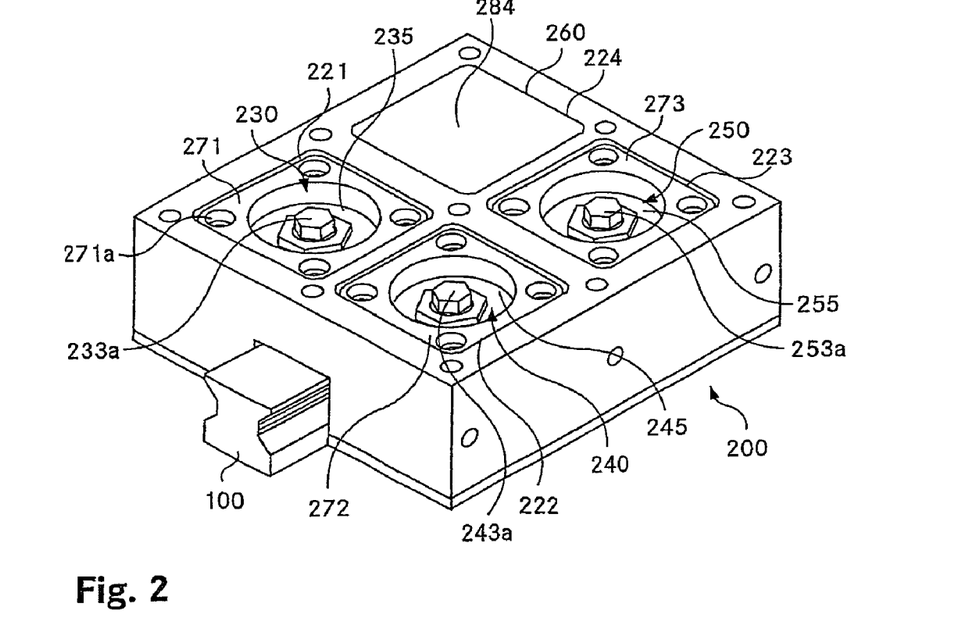
FIG. 2 shows a further oblique view of the linear guide.

FIG. 2 shows a further oblique view of the linear guide, the outside of the roll unit 200 being visible.

The roll unit 200 has four bearing bushes 221, 222, 223, 224 for receiving a roll insert 230, 240, 250, 260 in each case, each roll insert 230, 240, 250, 260 comprising a roll and the corresponding roll mounting. The roll inserts 230, 240, 250, 260 are held in the bearing bushes 221 ... 224 by means of tension plates 271, 272, 273, while each tension plate 271, 272, 273, by means of continuous orifices 271a arranged in its marginal regions, can be screwed by means of screws together with the margin of the respective bearing bush 221, 222, 223, 224. In the screwed together state, the underside of the tension plate 271, 272, 273 cooperates with the top side of a bearing disk 235, 245, 255 of the roll insert 230, 240, 250, 260 and, on the one hand, fixes the roll insert 230, 240, 250, 260 in the bearing bush 221 ... 224 and, on the other hand by frictional connection prevents a twisting of the roll insert 230, 240, 250, 260 with respect to the roll unit 200.

The tension plates 271, 272, 273 have centrally a continuous circular cutout, through which a hexagonal head 233a, 243a, 253a of the bearing bolt of the respective roll bearing passes and is thus accessible from outside. FIG. 2 illustrates how one of the bearing bushes 224 of the roll unit 200 is closed by means of a cover 284 which, inter alia, prevents the penetration of dirt from outside the roll unit 200. For continuous operation, the remaining bearing bushes 221, 222, 223 are also closed by means of such a cover.

FIG. 3A shows a cross section of the roll unit 200 of the linear guide along a plane transverse to the rail longitudinal direction, which plane runs through the center of the bearings of two rolls 231, 241 lying opposite one another with respect to the rail 100. The roll inserts 230, 240 in each case comprise a bearing bolt 233, 243 on which a split inner ring 237, 247 of an angular ball bearing 236, 246 is mounted. One of these angular ball bearings 236 is illustrated in detail in FIG. 3B. The angular ball bearings 236, 246 are two-rowed, and their outer ring 238, 248 at the same time forms on its outside the running surface 232, 242 of the roll 231, 241. The inner rings 237, 247 and outer rings 238, 248 are manufactured from a fully-hardened ball bearing steel. The pressure angle α between the plane of symmetry of the angular ball bearings 236, 246 and the forces transmitted by the individual rolls between the inner ring 237, 247 and the outer ring 238, 248 amounts to approximately 25°, so that forces acting on the bearings can be absorbed similarly well both in a lateral and in a suspended arrangement of the roll unit 200 on the rail 100.

The running surfaces 232, 242 have in cross section a middle portion 232a, 242a running parallel to the respective side surface of the rail 100 and also, adjacently to said middle portion laterally, the flank portions 232b, 232c, 242b, 242c running obliquely, so that the running surface 232, 242 has a conical shape in this region. The flank portions 232b, 232c, 242b, 242c contact the corresponding flanks 101b, 101c, 102b, 102c of the rail 100 and are slightly convexly curved (crowned), so that defined rolling points of the running surfaces 232, 242 with the lateral flanks 101b, 101c, 102b, 102c of the inner profiles 101, 102 of the rail 100 are obtained and differential slip between the rolls 231, 241 and the rail 100 is avoided.

The inner rings 237, 247 of the angular ball bearings 236, 246 are firmly clamped between a flange-like bearing portion 233c, 243c of the bearing bolt 233, 243 and a (thread-free) bearing disk 235, 245. The bearing disk 235, 245 is held axially nondisplaceably on the bearing bolt 233, 243 between the inner ring 237, 247 and a tension nut 234, 244. The tension nut 234, 244 cooperates via an internal thread with an external thread of the bearing bolt 233, 243 and has been screwed onto the thread to an extent such that the two parts 237a, 237b of the respective inner ring 237 touch one another (see FIG. 3B). In the angular ball bearings 236, 246, therefore, a prestress prevails which is dependent quantitatively on the geometry of the inner ring 237, 247 and of the outer ring 238, 248 and on the size of the balls 239.

The bearing bolt 233, 243 of the roll inserts 230, 240 is held on the roll unit 200 on both sides of the inner ring 237, 247 of the angular ball bearing 236, 246, to be precise, on the one hand, via the outer surface of the bearing disk 235, 245 in the correspondingly shaped bearing bush 221, 222 of the roll unit 200 and, on the other hand, with its flange-like bearing portion 233c, 243c in a counterbearing 215, 216 formed on the roll unit 200.

One of the bearing bolts 233 is designed eccentrically, that is to say the portion 233b of circular cross section which carries the inner ring 237 of the angular ball bearing 236 is eccentric with respect to the axis of rotation of the bearing bolt 233. Thus, by the bearing bolt 233 being rotated, a spacing of the roll 231 from the rail 100 or a prestress between the rolls 231, 241 and the rail 100 can be set. In the exemplary embodiment illustrated, the bearing bolt 243 of the opposite roll 241 is centric.

The assembly and adjustment of the linear guide takes place as follows. First, the roll inserts 230, 240, 250, 260 are composed, that is to say the rolls 231, 241, together with the still untensioned ball bearings 236, 246, are pushed onto the bearing bolts 233, 243, until the inner rings 237, 247 of the angular ball bearings 236, 246 contact the flange-like bearing portion 233c, 243c. Subsequently, the bearing disk 235, 245 is pushed onto the bearing bolt 233, 243, and the tension nut 234, 244 is tightened on the bearing bolt 233, 243 until the two parts 237a, 237b; 247a, 247b of the inner rings 237, 247 touch one another and therefore the angular ball bearing 236, 246 is prestressed to the predetermined value. At the same time, by frictional connection, a twisting of the bearing disks 235, 245 with respect to the bearing bolt 233, 243 or the tension nut 234, 244 is also prevented. The position of the tension nut 234, 244 is then fixed (not illustrated) by means of an axial securing device (known per se), for example by means of a screw running radially through the tension nut 234, 244 into the bearing bolt 233, 243.

Subsequently, the roll inserts 230, 240, 250, 260 can be inserted into the bearing bushes 221, 222 of the roll unit 200 and the roll unit 200 can be pushed laterally onto the rail 100, so that the running surfaces 232, 242 of the rolls 231, 241 come into contact with the inner profiles 101, 102 of the rail 100. The centric roll inserts 230, 240, 250, 260 can then be fixed to the roll unit 200 by the tension plates 272, 273 being screwed on.

Then, by means of a torque wrench, on the hexagonal head 233a of the eccentric bearing bolt 233, the eccentricity of the latter and therefore the predetermined prestress can be set accurately. The setting is fixed in that, here too, a tension plate 272 is screwed on axially until with its underside it contacts a corresponding upper surface of the bearing disk 235 and thus by frictional connection prevents a twisting of the roll insert 230, 260 and consequently an adjustment of the prestress. Since the tension plate 272 contacts the bearing disk 235 axially, tightening does not exert any influence on the prestress previously set.

Finally, covers 281, 282 are placed onto the orifices of the bearing bushes 221, 222 on the outside of the roll unit 200. The covers 281, 282 have inwardly directed resilient flanges which latch into the central orifice of the tension plate 271, 272 and thus retain the cover 281, 282 on the bearing bushes 221, 222.

Figure 3B:
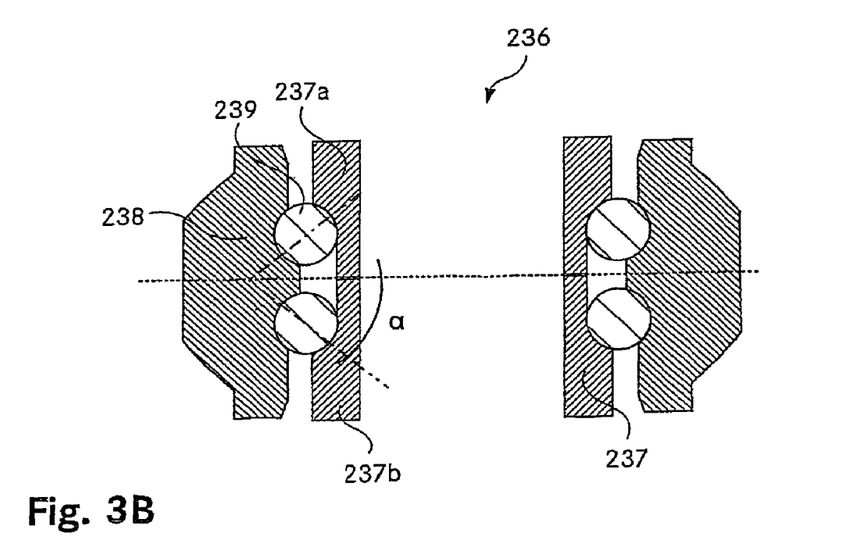
FIG. 3B shows in the form of a detail a view of a ball bearing for mounting a running roll.
Figure 4A:
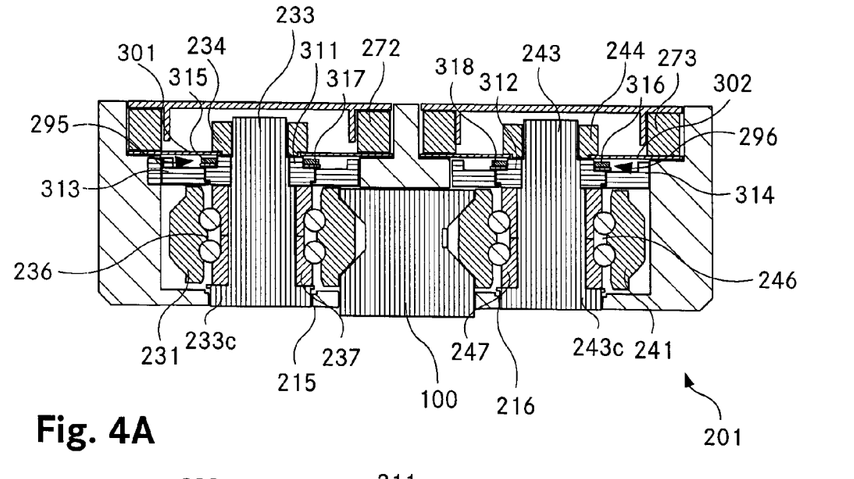
FIG. 4A shows a diagrammatic illustration of a cross section, transverse to the rail longitudinal direction, through a linear guide with a roll unit having axially movable rolls.
Figure 4B:
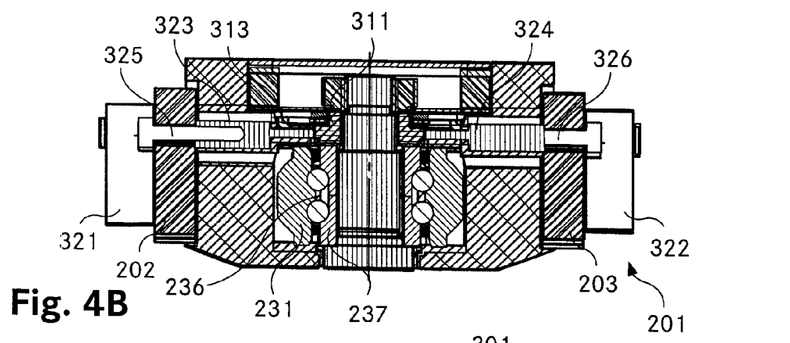
FIG. 4B shows a cross section through this roll unit, parallel to the rail longitudinal direction.
Figure 5:
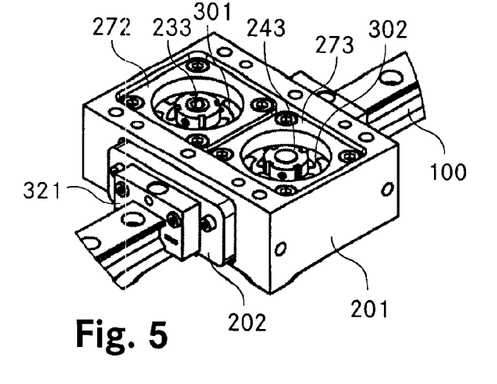
FIG. 5 shows an oblique view of the roll unit placed onto a rail.

FIG. 4A is a diagrammatic illustration of a cross section, parallel to rail longitudinal direction, through a linear guide with a roll unit 201 having axially movable rolls 231, 241; FIG. 4B shows a cross section, perpendicular to this, in the plane which contains the axis of rotation of the roll 231. FIG. 5 is an oblique view of the roll unit 201 placed onto a rail 100. The rail 100 is constructed identically to the rail according to the first embodiment; the construction of the roll unit 201 with axially movable rolls likewise correspond largely to that of the first embodiment, although the roll unit 201 illustrated comprises only two opposite rolls 231, 241. The differences from the roll unit 200 illustrated in connection with FIGS. 1-3 are dealt with below.

The roll unit 201 differs from this primarily in a different mounting of the rolls 231, 241 on the housing of the roll unit 201. Instead of the bearing disk which is firmly clamped between the tension nut 234, 244 and the inner ring 237, 247 of the angular ball bearing 236, 246 and thus retains the bearing bolt 233, 243 axially nondisplaceably on the housing, a plurality of elements are involved in the mounting, which allow an axial movability of the bearing bolt 233, 243 and consequently of the rolls 231, 241. These elements comprise a spring disk 301, 302 which is firmly clamped along its circumference between the tension plate 272, 273 and the housing of the roll unit 201. In a central orifice 301a of the spring disk 301, 302 (see FIG. 6), the latter is firmly clamped to the bearing bolt 233, 243 by means of a pressure ring 311, 312 between the tension screw 234, 244 and the inner ring 237, 247 of the angular ball bearing 236, 246.

Figure 6:
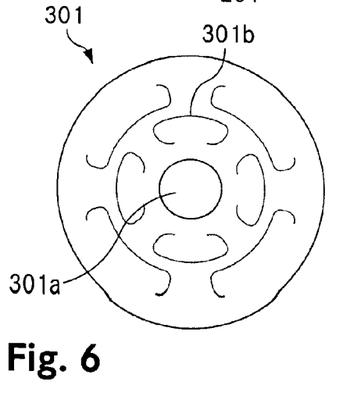
FIG. 6 shows a top view of a spring disk for the axially movable mounting of a roll.

The spring disk 301, illustrated in a top view in FIG. 6, is manufactured from spring steel with a thickness of approximately 0.2 mm. A plurality of slots 301b have been cut out symmetrically from the spring disk 301, preferably by means of laser cutting which allows burr-free cuts and small slot widths. The slots 301*b* have portions which are essentially in the form of an arc of a circle and run parallel to the circumference of the spring disk 301 and to which bent-back essentially radial portions are contiguous. Four slots 301*b* are arranged symmetrically to the center along an outer circle, the radial portions of which point outward with respect to the portions which are in the manner of an arc of a circle. Four further slots are offset in each case by 45° to the outer slots, again being arranged symmetrically to the center along an inner circle, their radial portions pointing inward. The arrangement of the slots 301*b* makes it possible for the central orifice 301*a* to execute an axial movement, that is to say a movement directed perpendicularly to the main surface of the spring disk 301, with respect to the circumference of the spring disk 301, but has high rigidity with respect to a torsional movement of the orifice 301*a* in relation to the circumference.

By virtue of a corresponding elastic deformation of the spring disk 301, 302, therefore, the bearing bolt 233, 243 and the roll 231, 241 fastened to it, together with the tension nut 234, 244 and pressure ring 311, 312, can be moved in the axial direction, that is to say parallel to the roll axis. The movement of these elements is guided by the inner surface of a guide ring 313, 314, which inner surface forms a plain bearing for the outer surface of the intermediate piece 295, 296, and also by the counterbearings 215, 216 on the housing of the roll unit 201 in which the flange-like portion 233*c*, 243*c* of the bearing bolt 233, 243 is guided axially displaceably. The guide ring 313, 314 is held on a pressure ring 311, 312 rotatably, but axially nondisplaceably. For this purpose, the pressure ring 311, 312 has on its underside an annular recess in which a corresponding annular projection of the guide ring 313, 314 is received. Moreover, the uppermost portion of the pressure ring 311, 312 has an external thread, onto which a nut 315, 316 for fixing a washer 317, 318 is screwed. The guide ring 313, 314 is fixed axially between the washer 317, 318 and the projection, but the pressure ring 311, 312 can be rotated, uninfluenced by the guide ring 313, 314, about its axis. The outside diameter of the guide ring 313, 314 corresponds to the inside diameter of the receptacle for the roll insert, so that the latter and consequently the pressure ring 311, 312 are held radially nondisplaceably in the housing. The movement of the roll 231, 241 is limited in the axial direction by a stop, formed on the housing, for the lowermost flange-like bearing portion 233*c*, 243*c* of the bearing bolt 233, 243. The maximum axial travel of the roll 231, 241 amounts to approximately 1-2 mm.

The roll unit 201 with axially movable rolls 231, 241 is inserted, for example, in an arrangement with two roll units which are rigidly connected to one another mechanically and cooperate with parallel rails. A first of the roll units has two axially fixed rolls, and the other has two axially movable rolls. Differences in the rail spacing, which are caused, for example, by the different thermal expansion of different materials, can therefore be compensated up to a certain upper limit, without the accurate positioning of the first roll unit being impaired. However, the roll unit 201 can also be used for other set objects where an axial compensation of the roll position with respect of the housing of the unit (and of elements arranged on it) is desired.

Roll units often have, in addition to the rolls 231, 241 contacting the rail 100, further elements which must cooperate suitably with the rail 100, for example components of measurement or brake systems or lubricating plates for the regular lubrication of the roll guide. It is clear from FIG. 4B how lubricating plates 321, 322 cooperating suitably with the rail can be fastened to a roll unit 201 having axially movable rolls 231. Parallel to the rail longitudinal direction, the guide ring 313 has sector-like recesses on both sides. A fastening part 323, 324 is received in each case in these recesses. These fastening parts, together with the rolls 231, are movable in the axial direction and make it possible to fasten end plates 202, 203 by means of radial screws 325, 326, the external threads of which cooperate with an internal thread in the fastening part 323, 324 and the screw heads of which retain the end plates 202, 203 of the roll unit 201. The lubricating plates 321, 322 (and other additional components) can then be fastened to the end plate 202, 203 and thus always have the same axial position as the rolls 231 cooperating with the rail.

The invention is not restricted to the exemplary embodiment illustrated. Depending on the actual application, for example, the geometry of the rail may be varied in terms of the type, cross section and shape of the profiling or in terms of the fastening to a basic body. The number, type and arrangement of the rolls on the roll unit, aspects of details of the roll bearings and their fastening to the roll unit are also variable. The fixing of the set prestress may take place in a way other than that stated above. In addition to the measurement system, the roll unit may be provided with a heavy-duty brake system which likewise cooperates with the rail, the measurement system and brake system advantageously cooperating with different regions of the rail, so that no mutual impairments occur.

In summary, it should be noted that the invention provides a linear guide which is suitable even for moving larger loads and can absorb corresponding forces, without the running properties or the positioning accuracy of the guide being adversely influenced.

The invention claimed is:

1. A linear guide, with
    a) a rail with profilings on two opposite sides;
    b) a roll unit, the roll unit and the rail being displaceable relative to one another in a rail longitudinal direction;
    c) the roll unit having at least two rolls which can run on the profilings of the opposite sides of the rail;
  wherein
    d) the rolls are mounted on the roll unit by means of prestressed angular ball bearings; and
    e) the rolls can be prestressed with a predetermined force with respect to the rail.

2. The linear guide as claimed in claim 1, wherein the prestress of the angular ball bearings and the prestress of the rolls with respect to the rail are coordinated with one another as a function of a nominal load, in such a way that a maximum deflection in the angular ball bearings and a maximum deflection of the rolls with respect to the rail under nominal load are approximately identical.

3. The linear guide as claimed in claim 1, wherein the angular ball bearings are two-rowed and have split inner rings.

4. The linear guide as claimed in claim 1, wherein running rings of the rolls are mounted by means of the angular ball bearings on bolts supported on both sides.

5. The linear guide as claimed in claim 1, wherein at least one of the rolls is mounted on an adjustable eccentric.

6. The linear guide as claimed in claim 5, wherein the eccentric comprises the following:
    a) an eccentric bolt, on which the roll is mounted via the angular ball bearing;
    b) a bearing disk which can be pushed onto the eccentric bolt;
    c) a tension nut having an internal thread, by means of which the tension nut can be screwed onto a corresponding external thread of the eccentric bolt, so that the bearing disk is firmly clamped between the tension nut and the angular ball bearing and the angular ball bearing is prestressed; and d) a tension plate which can be tightened in the axial direction in such a way that it cooperates frictionally with an outside of the bearing disk and fixes the latter and the eccentric bolt.

7. The linear guide as claimed in claim 6, wherein the eccentric bolt has a profiled head which is arranged in such a way that the prestress of the corresponding roll with respect to the rail can be set by means of a torque wrench and can subsequently be fixed by means of the tightening of the tension plate.

8. The linear guide as claimed in claim 1, wherein the rolls are mounted on the roll unit in such a way that they are movable in the direction of their axis of rotation with respect to the roll unit.

9. The linear guide as claimed in claim 8, wherein a bearing bolt, on which the roll is mounted via the angular ball bearing, is fastened in a central orifice of a spring disk, the spring disk being fastened in its marginal region to the roll unit, and the spring disk having a plurality of slots.

10. The linear guide as claimed in claim 1, wherein the rolls are arranged in such a way that their axes of rotation are oriented parallel to one another and to the opposite sides of the rail and also perpendicularly to the rail longitudinal direction.

11. The linear guide as claimed in claim 1, wherein the axes of rotation of the at least two rolls run in the same plane, the plane being oriented perpendicularly to the rail longitudinal direction.

12. The linear guide as claimed in claim 1, wherein the rail is manufactured from hardened and ground solid steel.

13. The linear guide as claimed in claim 1, wherein the profilings of the opposite sides of the rail are designed as inner profilings.

14. The linear guide as claimed in claim 1, wherein the profilings of the opposite sides of the rail have in each case two oblique flanks, the rolls being designed in such a way that each of the rolls cooperates with both flanks.

15. The linear guide as claimed in claim 14, wherein outer surfaces, cooperating with the flanks, of the rolls are curved convexly.

16. The linear guide as claimed in claim 14 or 15, wherein a pressure angle in the angular ball bearing is adapted to a pitch of the two flanks in such a way as to produce essentially identical part forces in the loaded angular ball bearings when the roll unit and the rail are arranged one above the other or next to one another in relation to one another.

17. The linear guide as claimed in claim 16, wherein the pressure angle comprises 25-35°.

18. The linear guide as claimed in claim 16, wherein the pressure angle comprises 20-40°.

19. The linear guide as claimed in claim 1, including a measurement system for detecting a position of the roll unit with respect to the rail.

20. The linear guide as claimed in claim 1, including a brake system which is fastened to the roll unit and has a brake key which can cooperate with one side of the rail in order to brake the relative movement of the roll unit and of the rail.

21. A roll unit for a linear guide as claimed in claim 1, comprising a) at least two rolls which can run on profilings of opposite sides of a rail;

wherein b) the rolls are mounted on the roll unit by means of prestressed angular ball bearings; and c) the rolls can be prestressed with a predetermined force with respect to the rail.

\* \* \* \* \*

UNITED STATES PATENT AND TRADEMARK OFFICE
CERTIFICATE OF CORRECTION

| | |
|---|---|
| PATENT NO. | : 7,918,604 B2 |
| APPLICATION NO. | : 11/988515 |
| DATED | : April 5, 2011 |
| INVENTOR(S) | : Christian Fleisch et al. |

It is certified that error appears in the above-identified patent and that said Letters Patent is hereby corrected as shown below:

ON THE TITLE PAGE:

At item (73), Assignee, change "Gugel Group AG, Langenthal (CH)" to --Güdel Group AG, Langenthal (CH)--.

Signed and Sealed this
Fifth Day of July, 2011

David J. Kappos
*Director of the United States Patent and Trademark Office*